United States Patent Office 3,637,651
Patented Jan. 25, 1972

3,637,651
ORTHO NITRATION OF THE PHENYL DIAZO COMPONENT OF AN AZO COMPOUND
Thomas Douglas Baron and Brian Ribbons Fishwick, Manchester, England, assignors to Imperial Chemical Industries Limited, London, England
No Drawing. Filed Oct. 21, 1968, Ser. No. 769,426
Claims priority, application Great Britain, Nov. 7, 1967, 50,615/67
Int. Cl. C09b 43/04
U.S. Cl. 260—207
3 Claims

ABSTRACT OF THE DISCLOSURE

Manufacture of disperse monoazo dyestuffs having at least one nitro group in ortho position to the azo group, which comprises treating the corresponding dyestuff containing a halogen atom in ortho position to the azo group with an alkali metal nitrite and a copper compound in a polar aprotic organic liquid.

This invention relates to an improved process for the manufacture of disperse azo dyestuffs containing nitro groups.

It has previously been proposed to manufacture disperse azo dyestuffs containing nitro groups in ortho position to the azo group by diazotising a suitable nitro-arylamine such as 2:4-dinitroaniline or 2:4:6-trinitroaniline and coupling the resulting diazo compounds with coupling components, in particular coupling components of the benzene series which couple in para position to an optionally substituted amino group. However in the case of such amines such as 2:4:6-trinitroaniline this process suffers from the serious disadvantage that, owing to side reactions and the slow rate of diazotisation, the yields of the diazo component and hence of the resulting dyestuffs are very low, and the dyestuffs are usually contaminated by undiazotised amines and decomposition products of the diazo components.

It has now been found that such dyestuffs can be readily obtained in high yield and purity by a novel reaction.

According to the present invention there is provided a process for the manufacture of thed isperse azo dyestuffs of the formula:

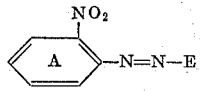

wherein E is a radical of the formula

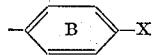

wherein X is a hydroxy group or a primary, secondary or tertiary amino group, and the benzene rings A and B may contain further substituents, which comprises treating an azo compound of the formula:

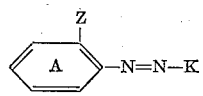

wherein A and E have the meanings stated, and Z represents a halogen atom, with an inorganic nitrite and a copper compound in an organic liquid.

In this reaction the halogen atom represented by Z, which is preferably a chlorine, bromine or iodine atom, is replaced by a nitro group. When starting from azo compounds of Formula I which contain a second halogen atom attached to the benzene ring A also in ortho position to the azo group, then this second halogen atom may also be replaced by a nitro group.

The process of the invention can be conveniently carried out by adding the copper compound and the inorganic nitrite to a solution of the azo compound in an organic liquid, and stirring the resulting mixture, preferably at a temperature between 0° and 100° C., to complete the reaction. The resulting dyestuff can can then be isolated by conventional methods, for example by adding water and filtering off the dyestuff which is precipitated.

The organic liquids used in the reaction are preferably polar aprotic organic liquids such as dimethyl, sulphoxide, formamide, dimethyl formamide, dimethyl acetamide, N-methylpyrrolidone, pyridine, quinoline, acetonitrile, benzo-nitrile and phosphoric acid tris(dimethylamide). If desired such liquids can contain small amounts of water, or there can be used mixtures of such organic liqiuds and inert organic liquids such as benzene or toluene.

The inorganic nitrites used in the reaction are preferably alkali metal nitrites such as sodium or potassium nitrite. At least one mole of the nitrite is used for each halogen atom which is to be replaced.

As examples of copper compounds which can be used in the process there may be mentioned cuprous oxide and cupric hydroxide, but more especially copper salts for example copper salts of inorganic acids such as cupric sulphate, and copper salts of organic acids in particular of aliphatic fatty acids such as copper formate, copper acetate, copper propionate, copper butyrate, copper n-hexoate, copper 2-ethyl-n-hexoate. Such salts can either contain water of crystallisation or be in the anhydrous form. It is preferred to use between 0.1 and 1.0 mol of the copper compound for each halogen atom which is being replaced. Whilst larger amounts of the copper compounds can be added, it is in fact found that such larger amounts are unnecessary as they do not assist the reaction in any way.

It is usually found advisable to carry out the reaction at temperatures below 100° C., preferably at temperatures between 15° C. and 100° C., since it is sometimes found that undesirable side reactions, brought about by the oxidising effect of the nitrite ions present, occur at higher temperatures, resulting in the dyestuffs becoming contaminated with impurities.

Preferably E is a radical of the formula:

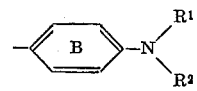

wherein $R^1$ represents a hydrogen atom or an optionally substittued alkyl radical, $R^2$ represents a hydrogen atom or an optionally substituted alkyl or aryl radical, and the benzene ring B optionally contains further substituents. The optionally substituted alkyl radicals represented by $R^1$ and $R^2$ are preferably optionally substituted lower alkyl radicals, while the optionally substituted aryl radical represented by $R^2$ is preferably an optionally substituted phenyl radical.

Throughout this specification the terms "lower alkyl" and "lower alkoxy" are used to denote alkyl and alkoxy radicals respectively containing from 1 to 4 carbon atoms; and as examples of such radicals there may be mentioned methyl, ethyl, n-propyl and n-butyl, and methoxy, ethoxy, n-propoxy and n-butoxy.

As examples of further substituents which can be present on the benzene ring B there may be mentioned fluorine, chlorine, bromine, trifluoromethyl, lower alkyl in particular methyl, lower alkoxy in particular methoxy, phenyl, phenoxy, lower alkyl sulphonyl, lower alkyl carbonyl, carbo lower alkoxy, acylamino in particular groups of the formula: —NHCOY wherein Y is hydrogen, lower alkyl or phenyl, carbonamido and sulphanamido and N-lower alkyl, and N,N-di(lower alkyl) derivatives thereof, and ureido (—NHCONH₂).

Above all E represents a radical of the formula:

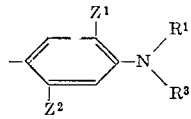

wherein R¹ and R³ each independently represents a hydrogen atom or an optionally substituted alkyl (in particular lower alkyl) radical, Z¹ represents hydrogen, lower alkyl or lower alkoxy and Z² represents hydrogen, lower alkyl, lower alkoxy, chlorine, bromine, trifluoromethyl or acylamino. It is however preferred that Z² represents an acylamino radical, in particular an acylamino radical of the formula —NHCOY wherein Y is hydrogen, lower alkyl or phenyl.

Alternatively E can represent a radical of the formula:

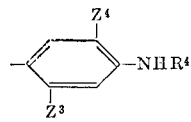

wherein R⁴ is hydrogen or optionally substituted alkyl (in particular lower alkyl) or aryl, Z³ is acylamino in particular —NHCOY wherein Y has the meaning stated, and Z⁴ is hydrogen, lower alkyl, lower alkoxy, phenyl, phenoxy, fluorine, chlorine, bromine, trifluoromethyl, lower alkylsulphonyl, lower alkylcarbonyl, carbo lower alkoxy and carbonamido and sulphonamido and N-lower alkyl and N,N-di(lower alkyl) derivatives thereof.

As examples of the lower alkyl radicals represented by R¹, R², R³ and R⁴ there may be mentioned methyl, ethyl, n-propyl and n-butyl radicals.

As examples of the substituted lower alkyl radicals represented by R¹, R², R³ and R⁴ there may be mentioned chloro lower alkyl such as β-chloroethyl, bromo lower alkyl such as β-bromoethyl, fluoro lower alkyl such as difluoromethyl, lower alkoxy lower alkyl such as β-methoxyethyl, β-ethoxyethyl, and β- or γ-ethoxypropyl, cyano lower alkyl such as β-cyanoethyl and β- or γ-cyanopropyl, hydroxy lower alkyl such as β-hydroxyethyl and β:γ-dihydroxypropyl, monocyclic aryl lower alkyl such as benzyl and β-phenylethyl, carbo lower alkoxy lower alkyl such as β-carbomethoxyethyl, β-carboethoxyethyl, β- or γ-carbomethoxypropyl and β- or γ-carboethoxypropyl, acyloxy lower alkyl for example lower alkyl carbonyloxy lower alkyl such as β-acetoxyethyl and β- or γ-acetoxypropyl, and phenylcarbonyloxy lower alkyl such as β-benzoyloxyethyl, groups of the formula

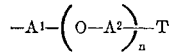

wherein A¹ and A² are each independently alkylene radicals of from 1 to 4 carbon atoms, T is hydroxy, lower alkoxy, lower alkyl carbonyloxy, cyano, chlorine, bromine or carbo lower alkoxy, and n is a positive integer not exceeding 10, and groups of the formula:

—A¹—COO—A²—T wherein A¹, A² and T have the meanings stated above.

The optionally substituted aryl radicals represented by R² and R⁴ are preferably optionally substituted phenyl radicals such as phenyl itself and tolyl, methoxyphenyl, chlorophenyl, bromophenyl and nitrophenyl.

Since the azo dyestuffs produced by the process of the invention are disperse dyestuffs, i.e. are insoluble in water, it is to be understood that none of the said dyestuffs or the starting materials of Formula I contain sulphonic acid groups which would confer solubility in water.

As examples of additional substituents which can be present on the benzene ring A there may be mentioned chlorine, bromine, nitro, cyano, lower alkyl in particular methyl, lower alkoxy in particular methoxy, trifluoromethyl, thiocyano, lower alkyl sulphonyl such as methylsulphonyl, lower alkyl carboxyl such as acetyl, carbo lower alkoxy such as carbomethoxy and carboethoxy, acylamino such as acetylamino and benzoylamino, sulphonamido and N-lower alkyl and N,N-di-(lower alkyl) derivatives thereof, carbonamido and N-lower alkyl and N,N-di(lower alkyl) derivatives thereof, and optionally substituted phenylazo, for example 4-nitrophenylazo, 4-hydroxyphenylazo or 4-methylphenylazo.

The azo compounds of Formula I used as starting materials can themselves be obtained by diazotising an amine of the formula:

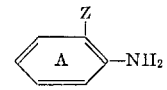

Formula II and coupling the resulting diazo compound with a coupling component of the formula E—H, wherein A, E and Z have the meanings stated, and the amine and coupling component are free from sulphonic acid groups.

As specific examples of the amines of Formula II there may be mentioned 2-chloroaniline,
2-iodoaniline,
2-bromoaniline,
2:3-, 2:4-, 2:5- or 2:6-dichloroaniline,
2:4:5- or 2:4:6-tri(chloro- or bromo-)aniline,
2:4-dinitro-6-(chloro- or bromo-)aniline,
2-(chloro- or bromo-)-4-nitro-aniline,
2-chloro-4-cyano-aniline,
2-chloro-4-carbomethoxy-aniline,
2-bromo-4:6-dicyanoaniline,
2-chloro-4-nitro-6-cyanoanaline,
2-chloro-4-methyl-6-nitroaniline,
2-chloro-4-methoxy-6-nitroaniline,
2:6-dibromo-4-methylsulphonylaniline,
2:4-dichloro-6-bromoaniline,
2-chloro-6-nitroaniline,
2:6-dibromo-4-sulphonamidoaniline,
2:6-dibromo-4-carbonamidoaniline,
2:6-dibromo-4-trifluoromethylaniline,
2-bromo-4-nitro-6-cyanoaniline,
2:6-dichloro-4-acetylaminoaniline,
2:6-dichloro-4-benzoylaminoaniline,
2-chloro-4-(phenylazo)aniline, and
2-(chloro or bromo)-4-(p-nitrophenylazo)aniline The coupling components of the formula E—H are coupling components of the phenol, and, above all, of the arylamine series which are free from sulphonic acid groups. Such coupling components are well known and can contain conventional substituents.

Alternatively disazo compounds which fall within the scope of Formula I can be obtained by diazotising an amine of Formula II, coupling the resulting diazo compound with a coupling component which contains a diazotisable amino group, for example m-aminophenol or m-aminoacetanilide, rediazotising and finally coupling with a coupling component.

As specific examples of coupling components of the formula E-H there may be mentioned phenols such as phenol itself, o-, m- and p-cresol, p-chlorophenol, 3- and 4-acetylaminophenol and resorcinol; naphthols such as 1- or 2-naphthol, 6-bromo-2-naphthol, 6-methoxy-2-naphthol and 2-naphthol-6-sulphonamide; acetoacetarylamides such as acetoacetanilide, acetoacettoluidide and acetoacetanisidide; 5 - pyrazolones such as 1:3 - dimethyl-5-pyrazolone, 1-phenyl - 3 - (methyl, carbonamido or carbomethoxy-5-pyrazolone and 1-[2'-, 3'-, or 4'-(chloro, bromo, nitro, methyl or methoxy)phenyl]-3-methyl-5-pyrazolone; 5-aminopyrazoles such as 1-phenyl-3-methyl-5-aminopyrazole, and arylamines such as 1-naphthylamine, 1-(N-β-hydroxyethylamino)naphthalene, 1:2:3:4 - tetrahydroquinoline, but more especially arylamines of the benzene series such as N,N-diethylaniline,
N,N-di(β-hydroxyethyl)-m-toluidine,
N,N-di(β-hydroxyethyl)-3-acetylaminoaniline,
N-ethyl-N-(β-cyanoethyl)-m-toluidine,
N-(β-hydroxyethyl)-N-(β-cyanoethyl)-3-acetylaminoaniline,
N,N-di(β-acetoxyethyl)-m-toluidine,
3-acetylamino-N,N-di(β-acetoxyethyl)aniline,
3-acetylamino-N,N-di(β-carbomethoxyethyl)aniline,
3-acetylamino-N,N-di[β-(β-methoxyethoxycarbonyl)ethyl]aniline,
2-methoxy-5-acetylamino-N-[β-(β'-methoxyethoxycarbonyl)ethyl]aniline,
3-formylamino-N,N-di-(β-carbomethoxyethyl)aniline,
2-ethoxy-5-acetylamino-N,N-di-(β-acetoxyethyl)aniline.
N,N-diethyl-3-acetylaminoaniline,
N,N-diethyl-3-propionylaminoaniline,
N,N-diethyl-3-isobutyrylaminoaniline,
N,N-diethyl-3-pivaloylaminoaniline,
N,N-diethyl-3-benzoylaminoaniline,
N,N-diethyl-3-methylsulphonylaminoaniline,
N,N-diethyl-3-ethyloxycarbonylaminoaniline,
N,N-diethyl-3-ureidoaniline and
m-aminoacetanilide.

A preferred class of azo dyestuffs obtainable by the process of the invention are the disperse monoazo dyestuffs of the formula:

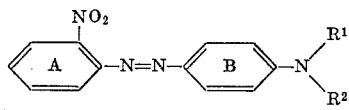

wherein A, B, $R^1$ and $R^2$ have the meanings stated, such dyestuffs being obtained from a monoazo compound of the formula:

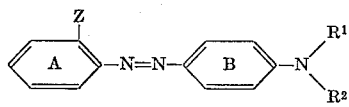

wherein A, B, Z, $R^1$ and $R^2$ have the meanings stated.

A further preferred class of azo dyestuffs obtainable by the process of the invention are the disperse monoazo dyestuffs of the formula:

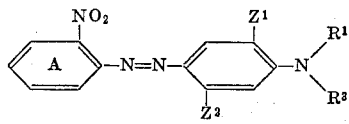

wherein A, $R^1$, $R^3$, $Z^1$ and $Z^2$ have the meanings stated, such dyestuffs being obtained from a monoazo compound of the formula:

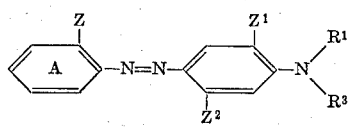

wherein A, $R^1$, $R^3$ Z, $Z^1$ and $Z^2$ have the meanings stated. In this class it is further preferred that $Z^2$ represents an acylamino group in particular of the formula —NHCOY wherein Y is hydrogen, lower alkyl or phenyl.

The process of the invention is particularly valuable for the manufacture of disperse monoazo dyestuffs of the formula:

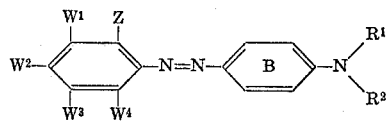

wherein B, $R^1$ and $R^2$ have the meanings stated, $W^2$ represents hydrogen, chlorine, bromine, nitro, cyano, thiocyano, lower alkylsulphonyl, trifluoromethyl, lower alkylcarbonyl, carbo lower alkoxy, carbonamido and N-lower alkyl and N,N-di(lower alkyl) derivatives thereof or sulphonamido and N-lower alkyl and N,N-di(lower alkyl) derivatives thereof, $W^3$ represents hydrogen, $W^4$ represents nitro, cyano, trifluoromethyl, lower alkylsulphonyl, lower alkylcarbonyl, carbo lower alkoxy, carbonamido and N-lower alkyl and N,N-di(lower alkyl)derivatives thereof or sulphonamido and N-lower alkyl and N,N-di(lower alkyl) derivatives thereof, $W^1$ represents hydrogen, chlorine, bromine, lower alkyl or carbo lower alkoxy, and $W^4$ represents hydrogen or when $W^1$ represents hydrogen then $W^4$ can also represent chlorine, bromine, lower alkyl or carbo lower alkoxy, such dyestuffs being obtained starting from a monoazo compound of the formula:

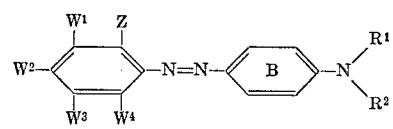

wherein B, $R^1$, $R^2$, $W^1$, $W^2$, $W^3$, $W^4$ and Z have the meanings stated. The dyestuffs of this preferred class are obtained in a higher yield and in a greater state of purity by the process of the present invention than the previously known method of diazotising an amine of the formula:

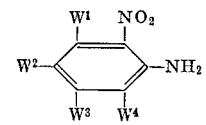

and coupling the diazo compound with a coupling component of the formula:

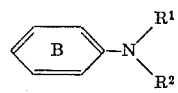

Above all the process of the invention results in very high yields and purity of the disperse monoazo dyestuff of the formula

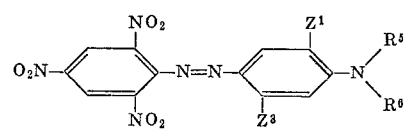

wherein $Z^1$ is hydrogen, lower alkyl or lower alkoxy, $Z^3$ is acylamino, $R^5$ is hydrogen or optionally substituted lower alkyl and $R^6$ is optionally substituted lower alkyl, such dyestuffs being obtained by starting from a monoazo compound of the formula:

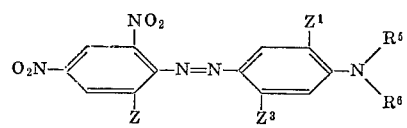

wherein Z, $Z^1$, $Z^3$, $R^5$ and $R^6$ have the meanings stated. It is further preferred that the acylamino group represented by $Z^3$ is of the formula: —NHCOY wherein Y is hydrogen, lower alkyl or phenyl.

The disperse azo dyestuffs obtainable by the process of the invention are valuable for colouring synthetic textile materials, in particular cellulose acetate, polyamide and, above all, aromatic polyester textile materials. The dyestuffs can be applied to such textile materials by the methods conventionally used for applying disperse dyestuffs to synthetic textile materials.

The invention is illustrated but not limited by the following examples in which the parts and percentages are by weight.

EXAMPLE 1

A solution of 1 part of cupric acetate in 50 parts of dimethylformamide is added to a solution of 6.05 parts of 2:4 - dinitro - 2' - acetamido-4'-[N,N-di(β-acetoxyethyl)amino]-5'-methoxy-6-bromoazobenzene (which is obtained by coupling diazotised 6-bromo-2:4-dinitroaniline with 2 - methoxy - 5 - acetamido-N,N-di(β-acetoxyethyl) aniline) in 250 parts of dimethylformamide, and the mixture is stirred for 5 minutes at 25° C. 0.7 part of sodium nitrite is added and the mixture stirred for 30 minutes at 25° C. The mixture is then poured into 500 parts of ice and water, and the precipitated dyestuff is filtered off, washed with water and dried.

The resulting 2:4:6-trinitro-2'-acetamido-4'-[N,N-di(β-acetoxyethyl)amino]-5'-methoxyazobenzene is obtained in a yield of 85%, and is identical with the dyestuff obtained by coupling diazotised 2:4:6-trinitroaniline with 2-methoxy - 5 - acetamido - N,N - di(β - acetoxyethyl) aniline, although the yield of the dyestuff by this latter method is only 31%.

The following table gives other examples which further illustrate the process of the invention which were carried out in a similar manner to that described in Example 1, the 6.05 parts of the azo compound used in that example being replaced by equivalent amounts of the azo compounds of the formula

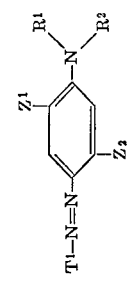

so as to give the compounds of the formula

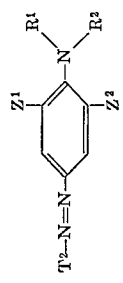

the symbols of which have the values given in the respective columns of the table, and the reactions being carried out for the times and at the temperatures indicated in the last two columns of the table.

| Example | T¹ | T² | Z¹ | Z² | R¹ | R² | Time of reaction in hours | Temperature of reaction in °C. | Yield (percent) |
|---|---|---|---|---|---|---|---|---|---|
| 2 | 2-bromo-4:6-dinitrophenyl | 2:4:6-trinitrophenyl | Methoxy | Formylamino | Ethyl | β-(β'-Methoxyethoxycarbonyl)ethyl | 0.5 | 25 | |
| 3 | do | 2:4-dinitrophenyl | do | Acetylamino | Hydrogen | do | 24 | 25 | |
| 4 | do | do | do | do | do | do | 1 | 70 | |
| 5 | 2-bromophenyl | 2-nitrophenyl | do | do | do | do | 1 | 70 | |
| 6 | 2,5-dichlorophenyl | 2-nitro-5-chlorophenyl | do | do | do | do | 2 | 70 | |
| 7 | 2-chloro-4:6-dinitrophenyl | 2:4:6-trinitrophenyl | do | do | do | β-Carbomethoxyethyl | 1 | 25 | |
| 8 | 2-bromo-4:6-dinitrophenyl | do | do | do | β-Carbomethoxyethyl | β-Carbomethoxyethyl | 24 | 25 | |
| 9 | do | 2:4-dinitrophenyl | Hydrogen | do | Hydrogen | do | 1 | 25 | |
| 10 | 2-bromo-4-nitrophenyl | 2-nitrophenyl | do | do | do | do | 24 | 70 | |
| 11 | do | 2-nitrophenyl | do | do | do | do | 1 | 70 | |
| 12 | 2-bromophenyl | 2:4:6-trinitrophenyl | do | do | do | do | 3 | 25 | |
| 13 | 2-chloro-4:6-dinitrophenyl | do | do | β-acetoxyethyl | β-acetoxyethyl | β-acetoxyethyl | 4 | 25 | |
| 14 | 2-bromo-4:6-dinitrophenyl | do | do | Hydrogen | Hydrogen | β-(β'-methoxyethoxycarbonyl)ethyl | 16 | 20 | |
| 15 | do | do | Methoxy | β-(β'-methoxyethoxycarbonyl)ethyl | | | 16 | 20 | |
| 16 | do | do | do | Amino | Hydrogen | do | 0.5 | 25 | |
| 17 | do | do | do | β-(β'-Methoxyethoxycarbonyl)ethylamino | do | do | 0.25 | 25 | |
| 18 | do | do | do | Methylamino | do | Methyl | 0.2 | 25 | |
| 19 | do | do | Hydrogen | Formylamino | Ethyl | Ethyl | 24 | 20 | |
| 20 | do | do | do | tert-Butyrylamino | do | do | 24 | 25 | |
| 21 | 2-chloro-4-nitrophenyl | 2:4-dinitrophenyl | do | Acetylamino | Hydrogen | β-(β'-Methoxyethoxycarbonyl)ethyl | 0.25 | 25 | |
| 22 | 2-bromo-4-nitro-6-carbomethoxyphenyl | 2:4-dinitro-6-carbomethoxyphenyl | do | do | do | do | 6 | 25 | |
| 23 | 2-bromo-4-nitro-6-cyanophenyl | 2:4-dinitro-6-cyanophenyl | do | Propionylamino | do | do | 4 | 25 | |
| 24 | 2-chloro-4-nitro-6-bromophenyl | 2:4:6-trinitrophenyl | Methoxy | n-Valeroylamino | do | Ethyl | 6 | 25 | |
| 25 | 2-bromo-4:6-dinitrophenyl | do | Hydrogen | Isobutyrylamino | Ethyl | Ethyl | 0.5 | 25 | |
| 26 | do | do | do | Ureido | do | do | 0.5 | 25 | |
| 27 | do | do | do | Methyl | Hydrogen | β-(β'-Methoxyethoxycarbonyl)ethyl | 4 | 25 | |
| 28 | do | do | do | Acetylamino | β-Methoxycarbonylethyl | β-Methoxycarbonylethyl | 0.5 | 25 | |
| 29 | do | do | do | do | β-Methoxycarbonylethyl | Phenyl | 24 | 25 | |
| 30 | 2-bromo-4-(p-nitrophenylazo) phenyl | do | do | do | Hydrogen | β-Methoxycarbonylethyl | 24 | 25 | |
| 31 | do | 2-nitro-4-(p-nitrophenylazo)-phenyl | Methoxy | do | do | do | 24 | 25 | |

EXAMPLE 46

0.7 part of sodium nitrate is added with stirring to a solution of 5.83 parts of the monoazo compound obtained by coupling diazotised 2-bromo-4:6-dinitroaniline with 2 - methoxy-5-acetylamino-N-[β-(β'-methoxyethoxy-carbonyl)ethyl]aniline in 50 parts of dimethylformamide. A solution of 1 part of cupric acetate monohydrate in 20 parts of dimethylformamide is then added, and the mixture stirred for 15 minutes at 25° C. during which time the colour changes from reddish-blue to greenish-blue. At this stage examination of the mixture by thin layer chromatography indicates complete reaction of all the monoazo compound used as starting material. The mixture is then poured into 200 parts of a mixture of ice and water, and the precipitated product is filtered off, washed with water and dried. The yield is 5 parts of the dyestuff of the formula:

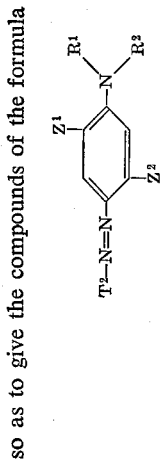

Similar results are obtained when the 70 parts of dimethylformamide used in this example are replaced by 70 parts of N-methylpyrrolidone and/or the 1 part of cupric acetate monohydrate is replaced by 2 parts of copper 2-ethyl-hexoate.

EXAMPLE 47

If in place of the 1 part of cupric acetate monohydrate used in Example 46 there is used 1 part of anhydrous cupric sulphate or 0.05 part of cuprous oxide and the reaction is carried out for 20 hours at 90° C. (instead of for 15 minutes at 25° C.) a similar results is obtained.

EXAMPLE 48

In place of the 300 parts of dimethyl formamide used in Example 1 there are used 300 parts of phosphoric acid tris(dimethylamide) when the same dyestuff is obtained.

EXAMPLE 49

In place of the 6.05 parts of the monoazo compound used in Example 1 there are used 3.3 parts of 3-acetyl-amino-4-(2'-chloro-4'-nitrophenylazo)phenol and the re- The following table gives further examples which illustrate the process of the invention which were carried out in a similar manner to that described in Example 1, the 6.05 parts of the monoazo compound used in that example being replaced by equivalent amounts of the azo compounds of the formula:

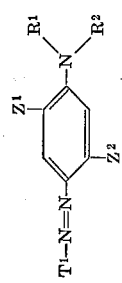

so as to give the compounds of the formula

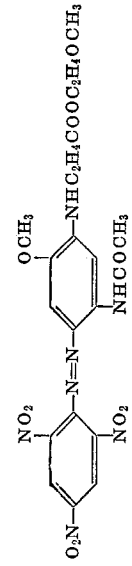

the symbols of which have the values given in the respective columns of the table, the reactions being carried out for the times and at the temperatures stated in the appropriate columns, and the yield of the resulting product being given in the last column of the table.

| Example | T¹ | T² | Z¹ | Z² | R¹ | R² | Time of reaction in hours | Temperature of reaction in °C. | Yield (percent) |
|---|---|---|---|---|---|---|---|---|---|
| 32 | 2-bromo-4:6-dinitrophenyl | 2:4:6-trinitrophenyl | Methoxy | Acetylamino | Hydrogen | β-(β'-Methoxyethoxy-carbonyl)ethyl | 0.5 | 25 | 80 |
| 33 | 2-iodo-4-nitrophenyl | 2:4-dinitrophenyl | Hydrogen | do | Ethyl | Ethyl | 3 | 25 | 84 |
| 34 | 2-bromo-4-nitro-6-cyanophenyl | 2:4-dinitro-6-cyanophenyl | do | do | do | do | 4 | 25 | 76 |
| 35 | 2-chloro-4-nitro-6-methylphenyl | 2:4-dinitro-6-methylphenyl | do | do | do | do | 2 | 25 | 70 |
| 36 | 2-bromo-4-nitro-6-methoxy- | 2:4-dinitro-6-methoxyphenyl | do | do | do | do | 2 | 25 | 86 |
| 37 | 2-bromo-4-nitro-6-carbomethoxy-phenyl | 2:4-dinitro-6-carbomethoxyphenyl | do | do | do | do | 4 | 25 | 72 |
| 38 | 2-bromo-4-nitro-6-methysul-phonyphenyl | 2:4-dinitro-6-methylsulphonylphenyl | do | do | do | do | 1 | 25 | 87 |
| 39 | 2-bromo-4:6-dinitrophenyl | 2:4:6-trinitrophenyl | do | Benzoylamino | do | do | 0.5 | 25 | 80 |
| 40 | do | do | do | Phenylacetylamino | do | do | 0.5 | 25 | 70 |
| 41 | do | do | do | Chloracetylamino | do | do | 0.5 | 25 | 66 |
| 42 | do | do | do | Methylsulphonyl | do | do | 0.5 | 25 | 40 |
| 43 | do | do | do | Acetylamino | do | do | 1 | 25 | 70 |
| 44 | 2-bromo-4-nitro-6-cyanophenyl | 2:4-dinitro-6-cyanophenyl | do | do | β-Hydroxyethyl | β-Hydroxyethyl | 5 | 25 | 75 |
| 45 | 2-bromo-4:6-dinitrophenyl | 2:4:6-trinitrophenyl | Methoxy | Formylamino | Hydrogen | β-(β'-Methoxyethoxy-carbonyl)ethyl | 0.25 | 25 | 60 | action is carried out for 48 hours at 90° C. whereby there is obtained the rubine dyestuff of the formula:

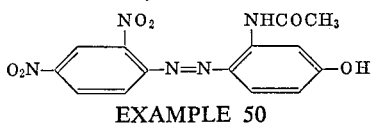

EXAMPLE 50

In place of the 6.05 parts of the monoazo compound used in Example 1 there are used 5.3 parts of the disazo compound of the formula:

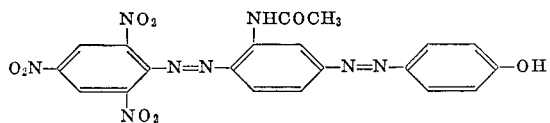

the reaction being carried out for 100 hours at 90° C., whereby there is obtained the bluish-red dyestuff of the formula

We claim:
1. Process for the manufacture of the disperse azo dyestuffs of the formula:

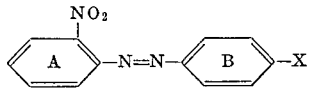

wherein X is selected from the group consisting of hydroxy, amino, phenylamino, N-lower alkylamino and N,N-di(lower alkyl) amino, the lower alkyl groups of which can be substituted by hydroxy, cyano, carbo lower alkoxy, lower alkylcarbonyloxy, chlorine, bromine, fluorine, lower alkoxy, phenyl, phenylcarbonyloxy,

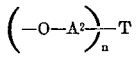

or —COO—$A^2$—T wherein $A^2$ is a lower alkylene radical, $n$ is a positive integer of from 1 to 10, and T is hydroxy, cyano, lower alkoxy, lower alkyl carbonyloxy, chlorine, bromine or carbo lower alkoxy the benezene ring A can contain further substituents selected from the group consisting of chlorine, bromine, nitro, cyano, lower alkyl, lower alkoxy, trifluoromethyl, thiocyano, lower alkyl sulphonyl, lower alkyl carbonyl, carbo lower alkoxy, —$NHCOY^1$ where $Y^1$ is lower alkyl or phenyl, carbonamido, N-lower alkyl carbonamido, N,N-di(lower alkyl) carbonamido, sulphonamido, N-lower alkyl sulphonamido, N,N-di-(lower alkyl)sulphonamido and phenylazo wherein the phenyl radical may be substituted by nitro, hydroxy or methyl; and the benzene ring B can contain further substituents selected from the class consisting of chlorine, bromine, trifluoromethyl, lower alkyl, lower alkoxy, —NHCOY where Y is hydrogen, lower alkyl or phenyl and ureido; which consists essentially of treating an azo compound of the formula

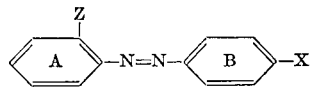

wherein Z is a halogen atom selected from the group consisting of chlorine, bromine and iodine, and A, B and X have the meanings stated above, with a copper salt or oxide and an alkali metal nitrite in a polar aprotic organic solvent at a temperature between 15° and 100° C.

2. Process as claimed in claim 1 wherein the azo compound is of the formula

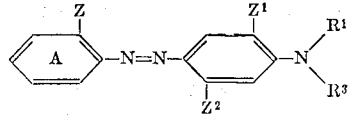

wherein the benzene ring A can contain further substituents selected from the group consisting of chlorine, bromine, nitro, cyano, lower alkyl, lower alkoxy, trifluoromethyl, thiocyano, lower alkyl sulphonyl, lower alkyl carbonyl, carbo lower alkoxy, —$NHCOY^1$ wherein $Y^1$ is lower alkyl or phenyl, carbonamido, N-lower alkyl carbonamido, N,N-di(lower alkyl)carbonamido, sulphonamido, N-lower alkyl sulphonamido, N,N-di(lower alkyl) sulphonamido and phenylazo wherein the phenyl radical may be substituted by hydroxy, methyl or nitro; Z is selected from the group consisting of chlorine bromine and iodine; $Z^1$ is selected from the group consisting of hydrogen, lower alkyl and lower alkoxy; $Z^2$ is selected from the group consisting of hydrogen, lower, alkyl, lower alkoxy, chorine, bromine, trifluoromethyl and —NHCOY wherein Y is selected from the group consisting of hydrogen, lower alkyl and phenyl; and $R^1$ and each independently selected from the group consisting of hydrogen, lower alkyl, chloro lower alkyl, bromo lower alkyl, fluoro lower alkyl, lower alkoxy, lower alkyl, cyano lower alkyl, hydroxy lower alkyl, phenyl lower alkyl, carbo lower alkoxy lower alkyl, lower alkyl carbonyloxy lower alkyl, phenylcarbonyloxy lower alkyl,

and —$A^1$—COO—$A^2$—T, wherein $A^1$ and $A^2$ are each independently lower alkylene radicals, $n$ is a positive integer of from 1 to 10, and T is hydroxy, cyano, lower alkoxy, lower alkyl carbonyloxy, chlorine, bromine, or carbo lower alkoxy.

3. Process as claimed in claim 1 wherein the azo compound is of the formula:

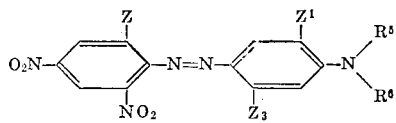

wherein Z is selected from the group consisting of chlorine, bromine and idoine; $Z^1$ is selected from the group consisting of hydrogen, lower alkyl and lower alkoxy; $Z^3$ is an acylamino group of the formula —NHCOY wherein Y is selected from the group consisting of hydrogen, lower alkyl and phenyl; $R_6$ is selected from the group consisting of lower alkyl, chloro lower alkyl, bromo lower alkyl, fluoro lower alkyl, lower alkoxy lower alkyl, cyano lower alkyl, hydroxy lower alkyl, phenyl lower alkyl, carbo lower alkoxy lower alkyl, lower alkyl carbonyloxy lower alkyl, phenylcarbonyloxy lower alkyl,

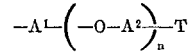

and —$A^1$—COO—$A^2$—T, wherein $A^1$ and $A^2$ are each independently lower alkylene radicals, $n$ is a positive integer of from 1 to 10, and T is hydroxy, cyano, lower alkoxy, lower alkyl carbonyloxy, chlorine, bromine or carbo lower alkoxy, and $R^5$ is a radical as defined for $R^6$ or a hydrogen atom.

References Cited
UNITED STATES PATENTS
2,387,987  10/1945  Felix et al. _____ 260—208 X
2,387,988  10/1945  Felix et al. _____ 260—208 X CHARLES B. PARKER, Primary Examiner C. F. WARREN, Assistant Examiner

U.S. Cl. X.R.
260—155, 162, 163, 186, 187, 193, 196, 197, 200, 205, 206, 207.1 207.3, 207.5, 208, 644, 646